United States Patent [19]

Ban et al.

[11] 4,159,492
[45] Jun. 26, 1979

[54] AUTOMATIC REVERSE APPARATUS FOR MAGNETIC RECORDER/PLAYER

[76] Inventors: Itsuki Ban, 829, Higashioizumi-machi, Nerima-ku, Tokyo; Kyoichi Inoue, 2-13 Hagiyama-cho, Higashimurayama-shi, Tokyo, both of Tokyo, Japan

[21] Appl. No.: 879,499

[22] Filed: Feb. 21, 1978

[30] Foreign Application Priority Data

Feb. 18, 1977 [JP] Japan ................................. 52/16163

[51] Int. Cl.$^2$ ....................... G11B 15/06; G11B 15/26
[52] U.S. Cl. .................................. 360/74.1; 360/96.2; 360/105; 242/198
[58] Field of Search ................. 360/74, 96, 90, 92–93, 360/105; 242/199–200

[56] References Cited

U.S. PATENT DOCUMENTS

| | | | |
|---|---|---|---|
| 3,781,019 | 12/1973 | Kikuchi | 360/96 |
| 3,810,240 | 5/1974 | Nozawa | 360/96 |
| 4,017,896 | 4/1977 | Takemoto | 360/74 |
| 4,031,556 | 6/1977 | Ban et al. | 360/74 X |

*Primary Examiner*—John H. Wolfe
*Attorney, Agent, or Firm*—Lane, Aitken & Ziems

[57] ABSTRACT

An improved automatic reverse apparatus for a magnetic tape recorder/player of the type which employs a magnetic tape contained in a cassette provided with first and second channels. The apparatus further includes a magnetic head with head channels adapted to contact and selectively record or reproduce each of the tape channels. A pair of reels are provided for winding and rewinding the tape and a pair of capstans and pinch rollers are utilized for alternatively transferring the tape in the forward and reverse directions between the reels. The apparatus includes an operating lever which can be moved and set at two different positions to effect reversal of tape direction and switching between tape channels. A mechanical signal is generated when the tape has been fully wound upon one of the reels which in turn causes reciprocating movement of an actuator mechanism. The latter movement causes the operating lever to swing to either its first or second position. The operating lever is locked at each position by a locking mechanism until another reciprocating movement disables the locking mechanism and causes the lever to swing to the next position. The movement of the operating lever to its first position at the end of the tape causes the first pinch roller to contact the first capstan and move the tape in one direction while reproducing a first tape channel. The movement of the operating lever to the second position at the end of the tape causes the second pinch roller to contact the second capstan and move the tape in the opposite direction while reproducing a second tape channel.

16 Claims, 20 Drawing Figures

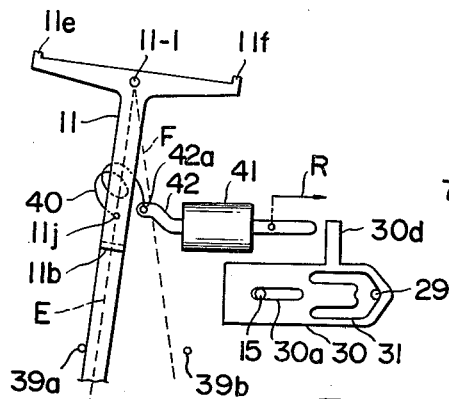
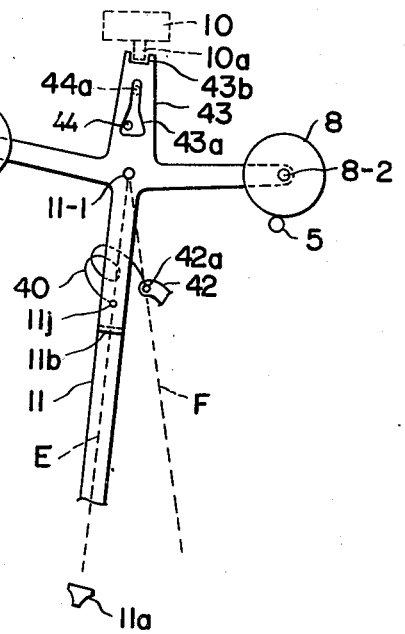
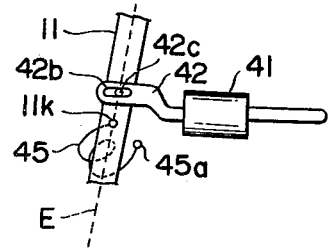
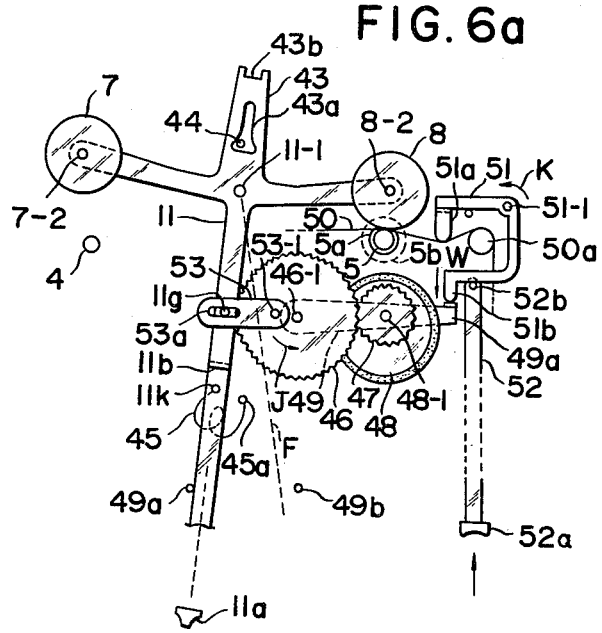
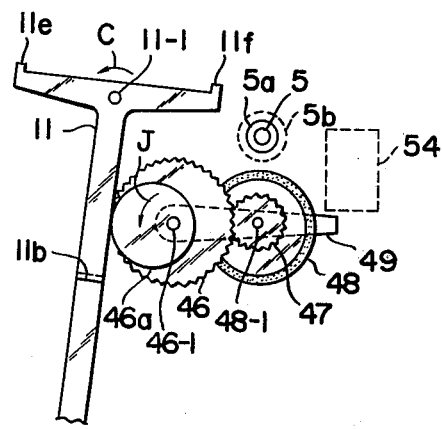

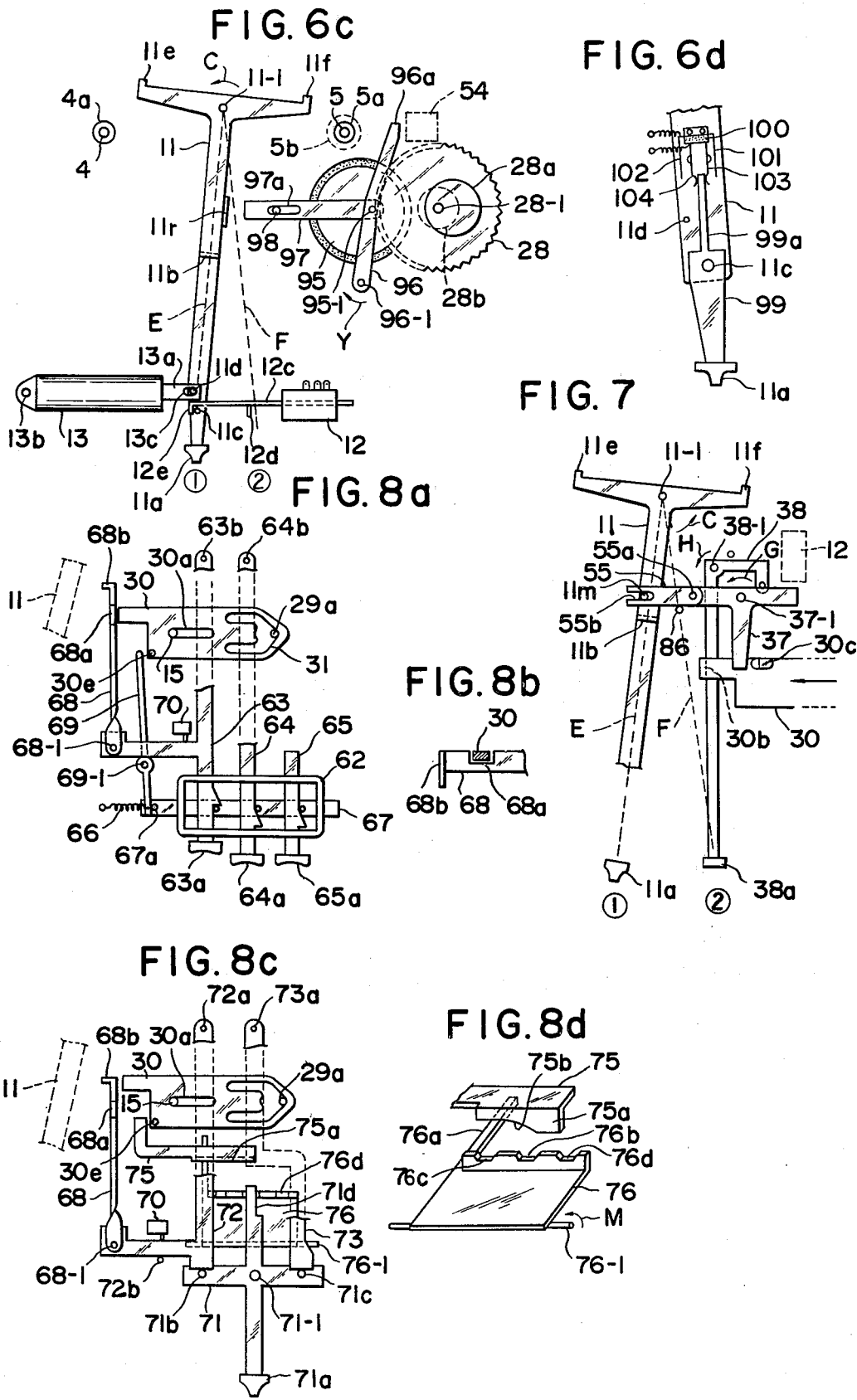

AUTOMATIC REVERSE APPARATUS FOR MAGNETIC RECORDER/PLAYER

BACKGROUND OF THE INVENTION

This invention relates to an automatic reverse apparatus used in magnetic recorder/players which employ a magnetic tape contained in a cassette.

Conventional automatic reverse apparatuses employ an electromagnetic plunger which is operated by a detection signal indicating the end of the magnetic tape to change the output of the magnetic head and the change running direction of the magnetic tape movement. This plunger, however, is large in size, requires a large input power and is costly. Further, this plunger generates large striking noise during operation and thus is limited in its design to a small mechanical output resulting in incomplete operation of the apparatus when the associated working parts are subjected to a heavy load. Such incomplete operation is especially anticipated when the apparatuses are used in automobiles or cars and consequently are exposed to dust. Further, the conventional apparatuses incorporate a large number of components and have many linkages which require relatively precise adjustment. Thus the conventional apparatuses are not capable of mass production and are liable to fail during use.

Further, the conventional apparatuses employ an electric lamp system for indicating the magnetic tracks or channels of the magnetic tape under reproduction. This lamp system, however, is costly, and often fails due to the breaking of the lamp filament. It is also difficult to observe the indication under direct sunshine when used in cars and automatic directions to the knobs for fast-feed and rewind is not possible. Manual operation of the knobs with judgement by the driver of the running directions of the magnetic tape is thus required. This manual operation may be an obstruction to safe driving.

It is desirable that, upon reaching the end of the magnetic tape in case of fast-feed, automatic changeover to the next channel is performed for automatic return to the reproduction mode and, upon reaching the end of the magnetic tape in case of rewind, automatic return to the reproduction mode is performed in the same channel. For such operations, complicated control of relays and an electromagnetic plunger has been required.

Further, changeover to the reproduction of another channel has usually be made by means of an electromagnetic plunger which is operated by depressing a push-button.

SUMMARY OF THE INVENTION

A primary object of the present invention is to provide an automatic reverse apparatus for magnetic recorder/players which can be designed into a flat and small-sized configuration, requires less components, can perform reverse operation with less noise and with larger output power, is stable in operation with less failure, and is capable of mass production.

Another object of the invention is to provide an automatic reverse apparatus for magnetic recorder/players which provides an indication of the magnetic track under reproduction without the use of an electric lamp system which is costly, and thus there is no operational failure due to breaking of lamp filament, observation of the indication is easy even under direct sunshine, and there is no requirement of manual operation of knobs which is to be made after judging the running direction of magnetic tape.

A further object of the invention is to provide an automatic reverse apparatus for magnetic recorder/players wherein, upon reaching the end of the magnetic tape in case of fast-feed, changeover to the next channel can be automatically performed for automatic return to reproduction mode and, upon reaching the end of the magnetic tape in case of rewind, return to reproduction mode in the same channel can be performed by means of a single lever.

A still further object of the invention is to provide an automatic reverse apparatus for magnetic recorder/players, wherein changeover to the reproduction of another channel during reproduction of a channel is performed by the manual operation of the end of a lever which protrudes onto a panel of the main body of recorder/player, thus permitting the changeover without contact trouble and any failure.

The present invention is embodied in a magnetic recorder/player of the type which uses a magnetic tape contained in a cassette and includes a first and a second capstan and a pair of pinch rollers adapted to selectively contact each respective capstan. The direction of the magnetic tape movement is changed by the selective contact of the capstans and the pinch rollers. A reel is driven for taking up the magnetic tape and, when the tape is completely taken up by the reel, changeover between the outputs of a first and a second channel of a magnetic head is effected for reproduction. The automatic reverse apparatus according to the present invention comprises reciprocating means to detect that the magnetic tape has been completely taken up on one of reels and makes one reciprocating movement. Lever means are set, through one reciprocating movement of the reciprocating means, at a first position, and set, through a succeeding reciprocating movement of the reciprocating means, at a second position. Interlocking means are operably connected to the lever means to cause the first pinch roller to contact with the first capstan and, at the same time, disconnect the second pinch roller from the second capstan when the lever means are moved to a first position. When the lever means are moved to a second position, the opposite pinch roller-capstan action occurs. A changeover switch is included which effects, concurrently with the respective above-mentioned contact/disconnection actions and according to the first and second positions of the lever means, switching between the outputs of the first and second channels, of the magnetic head to a reproduction amplifier.

The automatic reverse apparatus of the present invention alternatively comprises a detecting device which senses when the magnetic tape has been completely taken up on one of the reels and generates a signal. It further includes first lever means supported for rotation on a support shaft mounted to the main body of apparatus and a first gear mounted on the support shaft which can rotate independently of the first lever means. A second gear is provided on the free end portion of the first lever means and meshes with the first gear, the second gear having a radius of a half of that of the first gear. An eccentric wheel is formed integrally with the second gear and a spring elastically urges the eccentric wheel so that it may pressingly contact against a rotating shaft which is driven by the capstan or a capstan motor. A locking device and locks against elastic force of the spring and locks the first lever means to hold the eccentric wheel at a position where there is a gap between the minimum biasing point of the eccentric wheel and the rotating shaft. A device is provided for temporally disabling, through the signal from the detecting device, the locking of the first lever means by the locking device. A second lever is moved in a manner so that with every half rotation of the first gear, it is set at a first or a second position. Interlocking means are operably connected to the second lever means and perform similarly to the earlier described interlocking means.

The above and other objects and advantages of the invention will be apparent from the following description taken in conjunction with the accompanying drawings.

BRIEF DESCRIPTION OF THE DRAWINGS

FIGS. 4a and 4b, 5a to 5c, 6a to 6d, and 7 show respectively different embodiments of locking mechanisms for a T-shaped lever in the apparatus of FIG. 1;

FIGS. 8a to 8d show fast-feed/rewind mechanisms for use in the apparatus of FIG. 1;

DESCRIPTION OF THE PREFERRED EMBODIMENTS

Figure 1:
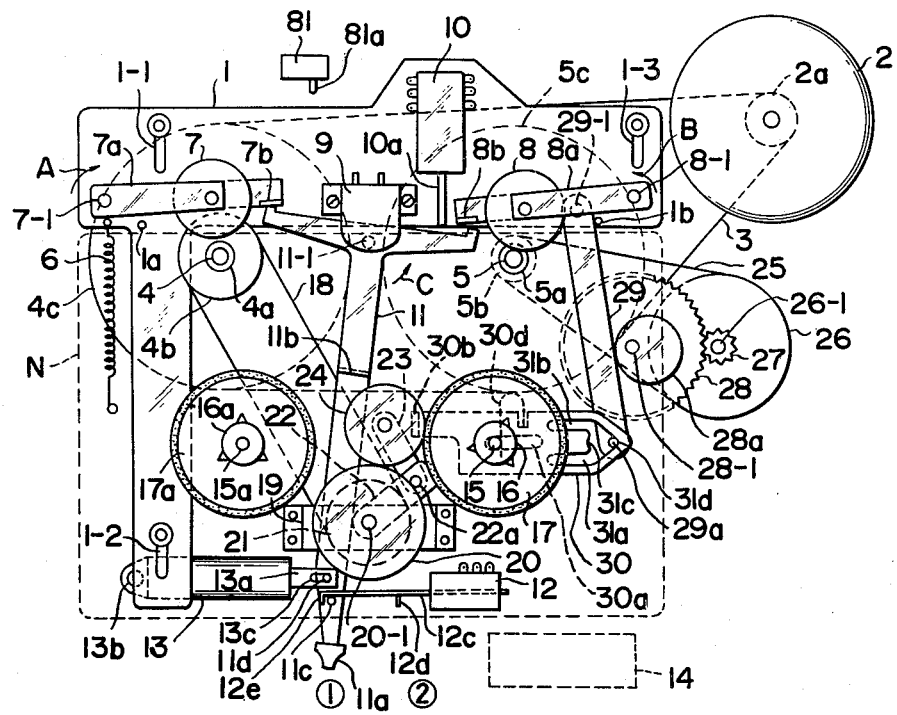
FIG. 1 is a plan view illustrating an automatic reverse apparatus of the invention used for magnetic recorder/players.

FIG. 1 shows the construction of an apparatus of the invention wherein dotted line N represents the actual size of a cassette. Other components are shown in their generally actual dimentions, and accordingly it will be understood that the apparatus may be fabricated in a small size.

On a deck (not shown) provided in the main body of the tape recorder/player is supported, through slots 1-1, 1-2, 1-3, a support plate 1 which carries thereon a magnetic head 9. The plate 1 is supported so that it can slide fore and aft. The support plate 1 is elastically urged toward the cassette N, that is, toward the deck by a spring 6. Capstans 4, 5 are also supported on the deck through bearings 4a, 5a, respectively, under the capstans 4, 5 are fixed flywheels 4c, 5c, respectively. An electric motor 2 is fixed to the deck. A pulley 2a is fixed to the rotating shaft of the motor 2. The flywheels 4c, 5c are operably connected by a drive belt 3 so that they may be rotated in a same direction.

On support shafts 7-1, 8-1 mounted on the support plate 1 are supported, respectively, levers 7a, 8a which are elastically biased in the directions of arrows A and B by springs (not shown). On the free ends of the levers 7a, 8a are provided, respectively, pinch rollers 7, 8 for rotation. On a support shaft 11-1 mounted on the deck is supported a T-shaped lever 11 which is elastically biased in the direction of arrow C by a spring (not shown). The opposite end portions of the horizontal arm of the T-shaped lever 11 abut with bent portions 7b, 8b of the levers 7a, 8a, respectively. The end portion of the vertical arm of the T-shaped lever 11 protrudes through a panel of the main deck body and has a knob 11a fixed to its end.

In the state as shown, the pinch roller 8 presses a magnetic tape against the capstan 5 so that the magnetic tape runs rightward. The magnetic tape is in sliding contact with the front face of the magnetic head 9 and is in a reproduction mode. Since the lever 7a is maintained in its counterclockwise swung position by the T-shaped lever 11, the pinch roller 7 is kept away from the capstan 4. On support shafts 15a, 15 mounted on the deck are supported reels 16a, 16 which are fabricated integral with reel-stands 17a, 17, respectively. The reel 16a is a take-up reel and the reel 16 a supply reel. In an automatic reverse apparatus, however these two reels serve alternately as take-up and supply reels.

A pulley 21 is supported on a support shaft 20-1 mounted on a support 19 which is fixed to the deck. The pulley 21 and a pulley 4b, which is fixed to the capstan 4, are operably connected by a drive belt 18. The pulley 21 and a wheel 20 are coupled to each other through a conventional slip mechanism consisting of a felt sheet and a plate spring. To the support shaft 20-1 is loosely fit a lever 22. To the free end of the lever 22 is pivotally connected a lever 23. On the free end of the lever 23 is provided an idler 24. The levers 22 and 23 are elastically urged toward each other by a spring (not shown) so that the idler 24 may be lightly pressed against the wheel 20. As the pulley 4b is rotating clockwise, the levers 22, 23 are subjected to a clockwise torque by friction between associated parts and, accordingly, the idler 24 presses against a rubber ring provided around the periphery of the reel stand 17 in a wedging angle relationship to drive the reel-stand 17 clockwise and take up the magnetic tape. Since the movement of the magnetic tape is restricted by the rotation of the capstan 5, the wheel 20 and the pulley 21 slip with respect to each other.

When the T-shaped lever 11 is swung counterclockwise and locked by means described hereinbelow, the right-hand arm of the T-shaped lever 11 presses the bent portion 8b of the lever 8a to swing the lever 8a clockwise. Accordingly, the pinch roller 8 moves away from the capstan 5. At the same time, the pressing action of the left-hand arm of the T-shaped lever 11 against the bent portion 7b is removed and the pinch roller 7 comes into pressing contact with the capstan 4. Also at this time, an abutting pin 11c, which is mounted on the T-shaped lever 11, pushes a bent projection 12d, which is formed on an actuator 12c, to operate a changeover switch 12 for reversing the motor 2. Accordingly, the capstan 4 will be driven counterclockwise and the idler 24 departs away from reel-stand 17 and comes into pressing contact with a rubber ring, provided around the periphery of the reel-stand 17a, in a wedging angle relationship, to drive the reel-stand 17a counterclockwise.

The numeral 10 indicates a changeover switch which is fixed to the support plate 1. The end portion of an actuator 10a of the switch 10 is in a position to abut against the right-hand arm of the T-shaped lever 11. Accordingly, in the shown state where the magnetic tape is running rightward, the output of the 1st channel of the magnetic head 9 is provided to a reproduction amplifier (not shown). When the T-shaped lever 11 has been swung counterclockwise and the magnetic tape is running leftward, the actuator 10a is depressed by the right-hand arm of the T-shaped lever 11 to activate the changeover switch 10 and thereby switch the output of the 2nd channel of the magnetic head 9 to the reproduction amplifier. As will be understood from the above description, with each rightward and leftward swing of the T-shaped lever 11, reproduction will switch between the first and second channels on the magnetic tape. Since the changeover switch 10 is located near the magnetic head 9, induction noise will not be picked up.

The vertical arm of the T-shaped lever 11 is bent downward at a portion 11b and extends along the back side of the support 19 to protrude onto the front panel of the main deck body. When the support plate 1 is moved backward away from the cassette N by means which will be described hereinbelow in conjection with FIG. 8, the magnetic head 9 departs away from the magnetic tape, and the levers 7a, 8a come into abutment respectively with abutting pins 1a, 1b, which are mounted on the support, to be moved backward therewith. Accordingly, the pinch rollers 7, 8 depart away from the capstans 4, 5. Thus, the magnetic tape runs at a high speed because the tape is released from the restriction due to the capstan and the slip between the pulley 21 and the wheel 20 is eliminated. The magnetic tape runs at the high speed, rightward when the motor 2 rotates in the forward direction, and leftward when the motor rotates in the reverse direction, to be fast-fed or rewound.

The mechanism of FIG. 8 for moving the support 1 fore and aft is indicated in FIG. 1 by dotted line 14 and is disposed in front of the main deck body. Since, in this state, the support 1 is at its aft moved position, by providing in the main body an electric switch 81 with its actuator 81a adapted to abut against the rear edge of the support 1 for actuating the switch, the running speed of the magnetic tape can be further increased. The switch 81 is a switch for rendering inoperative a governor which serves to govern the motor 2 to rotate at a fixed normal speed, as will be described in detail hereinbelow in conjection with FIG. 9. It will be noted that the lever 11 need not be T-shaped, but may also be a Y-shaped lever which offers the equivalent effect as the T-shaped lever. Alternatively, it may be a single linear lever which is adapted to be swung to the right and left to alternately swing the levers 8a, 7a through a lever-linkage.

The cassette N can be inserted into the main body from above. Hubs in the cassette being fit in the reels 16, 16a and the capstans 4, 5 move into the cassette to sit at their predetermined positions. In case the recorder/player is used in a car, there may be provided, though is omitted from FIG. 1, a mechanism wherein, upon being inserted into the main body of the apparatus through an opening which is formed in the front panel, the cassette will, through a lever-linkage, automatically drop down to a predetermined position. At the same time, a power supply switch is rendered on and the support 1 is automatically moved forward to start reproduction. Upon depression of an eject push-button, the cassette will rise upward from the deck surface. At the same time, the support 1 is moved backward and the cassette is ejected from the main body.

In the present embodiment, the motor 2 is reversed for reversing the direction of the magnetic tape. Alternatively, the manner of belting between the pulley 2a of the motor 2 and the flywheels 4c, 5c may be changed so that the flywheels 4c and 5c may be driven in the opposite directions with respect to each other so that the capstan 4 may be rotated counterclockwise and the capstan 5 clockwise. With such manner of belting, the motor 2 need not be reversed, and by simply controlling contact/non-contact between the pinch rollers 7, 8 and the capstans 4, 5, the direction of the magnetic tape can be changed. In this case, the changeover switch 12 may be omitted and a known idler system employed to drive the reel-stands 17, 17a. This idler system is operated through the rightward/leftward movement of the T-shaped lever 11 to selectively drive the reels 16, 16a.

The reciprocation movement of a bar 30 at the time when the whole of the magnetic tape has been taken up on the reel 16 will now be described. A pulley 26, which is pivoted on the deck through a support shaft 26-1, and a pulley 5b, which is fixed to the capstan 5, are operably connected to each other by a drive belt 25. A gear 28, which is pivoted on the deck through the support shaft 28-1, and a gear 27 mesh with each other. The gear 27 and the pulley 26 are formed as an integral unit. The gear 28 is formed integral with an eccentric cam 28a. A lever 29 is pivoted on the deck through a support shaft 29-1 and is elastically biased counterclockwise by a spring (not shown) so that the free end of the lever 29 is in pressing contact with the eccentric cam 28a. Accordingly, the lever 29 is slowly swung to the right and left. The bar 30 is loosely fit to support shaft 15 of the reel-stand 17 through a slot 30a, which will now be described in detail in conjection with FIG. 3.

Figure 3:
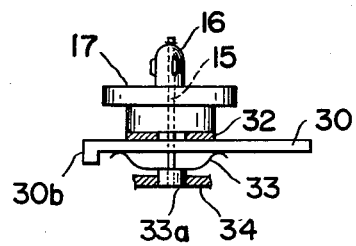
FIG. 3 is a side view illustrating a reel and a reel-stand in the apparatus of FIG. 1.

In FIG. 3, similar numerals indicate like parts and detailed description of them is omitted. On the deck 34 is mounted the support shaft 15. On the lower surface of the reel-stand 17 is applied a felt sheet 32 which is adapted to be interposed between the reel-stand 17 and the bar 30 in contact thereto. Thus the reel-stand 17 and the bar 30 are in a frictional coupling relationship to each other. As shown in FIG. 1, a generally U-shaped wire spring 30d is provided with its right-hand end fixed to the bar 30 and its free end in pressing contact against the support shaft 15. Between a cylinder 33a and the bar 30 is disposed a plate spring 33 for pressing the bar 30 upward. Accordingly, with rotation of the reel-stand 17, torque in the same direction as the rotational direction of the reel-stand 17 is applied to the bar 30. During clockwise rotation of the reel-stand 17, a guide pin 29a, which is mounted on the lever 29, will slide to the right and left in a slit 31b which is provided in the bar 30. During counterclockwise rotation of the reel-stand 17, the pin 29a will slide to the right and left in a slit 31a which is also provided in the bar 30. When the whole of the magnetic tape has been taken up on the reel 16 or 16a, the reel-stand 17 stops rotation, and accordingly, the guide pin 29a comes to the position shown in FIG. 1 and then moves leftward to abut against a depressed portion 31c formed in the bar 30. Then, with a further swing of the lever 29, the bar 30 is moved leftward against the elastic force of the spring 30d, and then returns back to its original position. When rotation of the reel-stand 17 ceases, the above-described reciprocating movement of the bar 30 is repeated, but, when the reel-stand 17 starts counterclockwise or clockwise rotation, the guide pin 29a slides in the slit 31a or 31b, and thus the bar 30 is maintained at its rightward position. As seen from the above description, upon termination of reproduction of one channel (track) on the magnetic tape, the bar 30 begins reciprocating movement to the right and left, and during reproduction, the bar is kept at its rightmost position.

The above has been described as an example of the detection means employed by the apparatus. There may be employed other alternative means which are adapted for reciprocating movement when the reel-stand stops. The above-described reciprocating bar is powerful and offers little striking noise.

Figure 2A:
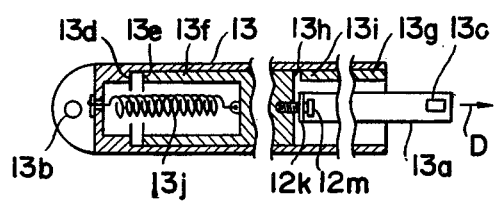
FIGS. 2a and 2b are plan views illustrating some components of the apparatus of FIG. 1.
Figure 2B:
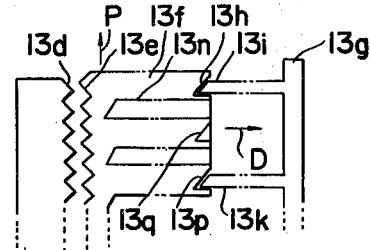

A locking mechanism for the T-shaped level 11 will now be described in conjunction with FIGS. 2a and 2b (details thereof being described hereinbelow) and FIG. 1. The locking mechanism 13 is similar to a mechanism used in ball pens such as a push-on/push-off switch. In a hole 13c, which is provided in the right-hand end portion of an actuator 13a, is loosely fit a guide pin 11d which is mounted on the T-shaped lever 11. A bent portion 30b, which is formed at the left end of the bar 30, abuts against the T-shaped lever 11. Upon termination of reproduction of the 1st channel, the bar 30 moves leftward to urge the T-shaped level 11 to swing clockwise and accordingly the actuator 13a is pushed to the left. Accordingly, locking of the actuator 13a is disabled, and the actuator 13a moves to the right. Accordingly, the T-shaped lever 11 swings clockwise, but immediately thereafter, swings counterclockwise to be locked again by the actuator 13a. At this time, the abutting pin 11c comes into abutment against the bent portion 12d of the actuator 12c to make the actuator 12c slide to the right and the changeover switch is actuated for reversing the motor 2. Consequently, the magnetic tape begins to run in the opposite direction, and accordingly the reel-stand 17 starts rotation, the bar 30 returns to the right and is kept there, and reproduction of the 2nd channel begins. Upon termination of this reproduction, the bar 30 moves to the left again, and the T-shaped lever 11 swings clockwise, and accordingly the actuator 13a is moved to the left. When the actuator 13a comes to a position exceeding leftward some distance from the position shown in the figure, the abutting pin 11c abuts against a bent portion 12e of the actuator 12c to make the actuator 12c slide to the left, and accordingly the changeover switch 12 comes to its original state to drive the motor 2 in the forward direction. And, when the T-shaped lever 11 swings counterclockwise to a slight degree, the actuator 13a is locked, and accordingly the T-shaped lever 11 is locked at the position shown in the figure. Accordingly, reproduction of the 1st channel begins as described above. The locking mechanism 13 is rotatably supported at its left end portion by a support shaft 13b which is mounted to the deck.

As will be understood from the above description, in the apparatus of the invention, upon termination of reproduction of the 1st channel, the T-shaped lever 11 swings counterclockwise to its second position, and thus reproduction of the 2nd channel begins, and, upon termination of this reproduction of the 2nd channel, the T-shaped lever 11 swings clockwise to its first position, and thus reproduction of the 1st channel begins. Locking of the T-shaped lever 11 at its first and second positions can also be obtained by means of a mechanism which employs the mechanical operating mechanism of a conventional push-on/push-off switch, electrical parts thereof being omitted.

During reproduction, when the knob 11a is pushed leftward by hand, the actuator 13a is moved leftward, and accordingly the T-shaped lever 11 is released from locking and swings counterclockwise to be locked to its second position. Thus, changeover to reproduction of the 2nd channel can be performed by manual operation. Similarly, by pushing the knob 11a rightward, changeover to reproduction of the 1st channel can be obtained. Since the knob 11a moves to the right and to the left depending on the reproductions of the 1st and 2nd channels, provision of marks 1, 2, for example, as shown in the figure, offers simple means for indicating the channel under reproduction. Thus, according to the invention, disadvantages in the prior art lamp indication system and push-button system can be eliminated. Further, in the apparatus of the invention, movement of the T-shaped lever 11 between its first and second positions and movements of other working parts are accompanied with little noise.

Relationship between rotational angle of the cam 28a and position of the actuator 12c of the slide changeover switch 12 will now be described. In the state shown in FIG. 1, the rotating cam 28a is at an angular position where the biasing radius of the cam or distance between the rotating axis of the cam and its contact point with the lever 29 has the minimum value. Then, when the cam 28a rotates to a point which is some angle before the maximum biasing radius with respect to the lever 29, the abutting pin 11c comes into abutment against the bent portion 12e to operate the changeover switch 12 for reversing the motor 2, and the T-shaped lever 11 begins to return back and then is locked by the locking device 13.

The above-described sequence of operations is employed when the motor 2 direction reversed by means of the changeover switch 12. However, as described above, automatic reverse operation can also be performed with the motor 2 running in one direction without the use of the changeover switch 12. In this case, the capstans 4 and 5 are driven in opposite directions with respect to each other, and the automatic reverse operation is performed through contact/non-contact of the pinch rollers 7, 8 against the capstans 4, 5. That is, when the T-shaped lever 11 is at its first position as shown in FIG. 1, the magnetic tape runs rightward and the 1st channel reproduction is made, and when the T-shaped lever 11 swings counterclockwise to its second position, the magnetic tape runs leftward and the 2nd channel reproduction is made. In this case, as a rule, a known idler system is employed, as described above, and the reel-stand 17 and 17a are selectively driven through rightward/leftward movements of the T-shaped lever 11. The reel-stand driving mechanism shown in FIG. 1 may alternatively be employed.

In place of the reel-stand driving mechanism illustrated in FIG. 1, other means may be employed, wherein selective driving of the reel-stands 17, 17a can be automatically obtained through forward/reverse rotations of the motor 2.

In the illustrated embodiment, the support 1 is supported in a manner that it can move fore and aft with respect to the deck through the slots 1-1, 1-2, 1-3. Alternatively, the support 1 may be fixedly secured to the main body, and the deck (carrying thereon the motor 2, the T-shaped lever 11, the capstans 4, 5, the flywheels 4c, 5c, the reels and reel-stands 16, 16a, 17, 17a and other associated members) is supported in a manner that the deck can be lightly moved fore and aft with respect to the main body by means of rollers. When the deck comes near to the support 1, reproduction mode will take place, and, when the deck retires away from the support 1, fast-feed or rewind mode will take place. Since such fore and aft movement of the deck is made with respect to the main body, employment of a click-stop mechanism will be advantageous. With such click-stop mechanism, major part of the deck can be drawn forward out of the main body, by hand or by means of elastic force of a spring or springs, with safety, and the whole of the cassette N is exposed to the exterior, and accordingly replacement of cassette is easy. This is especially advantageous in case where the main body is embedded in a dashboard of a car. The motor 2 is located, as shown in FIG. 1, on the right side of the support 1 in order to avoid, during fore and aft movement of the deck, contact or abutment with the support 1 which is fixed to the main body.

The locking device for the T-shaped lever 11 will now be described in detail in conjunction with FIG. 2. Referring to FIG. 2a, in a cylindrical main body 13 of molded plastic is provided a cylindrical actuator 13f for sliding to the right and left. The actuator 13a, which is made of a metal piece, has at its left end a bent portion. A hole is formed in this bent portion and is loosely fit to a screw 12m which is fixed to the right end wall of the actuator 13f. Accordingly, the actuator 13a can rotate with respect to the actuator 13f. The interior surface of a left end portion 13d of the main body 13 is formed into teeth, and a confronting left end face 13e of the actuator 13f also is formed into teeth of the same pitch as the teeth 13d, as shown in the exploded view of FIG. 2b.

The portion 13d and the actuator 13f are operably connected by a spiral spring 13j. The left end 13i of a hill-like projection 13g, which is fixedly provided on the inner surface of the main body 13, is formed into a slant surface, and the actuator 13f, which confronts this slant surface, is provided with depressions 13n and 13h. By force which is exerted, through the T-shaped lever 11 and the abutting pin 11d, on the actuator 13a, the actuator 13a is pulled in the direction of arrow D, but movement of the actuator 13a in the direction of arrow D is restricted by the mutual abutment of projections 13i, 13k and depressions 13h, 13p, whereby locking is effected.

When the T-shaped lever 11 swings clockwise, the actuator 13f is moved leftward through the spring 13j, and the teeth 13d come into abutment against the teeth 13e. Since the teeth 13d and 13e are disposed in a lagged relationship in phase with respect to one another, the actuator 13f is rotated in the direction of arrow P as shown in FIG. 2b. At this time, the projections 13i, 13k are disengaged from the depressions 13h, 13p. The projection 13i will rotate until it encounters the open end of the depression 13n which it enters. As the T-shaped lever 11 swings counterclockwise to its second position, the projection 13i slides into the depression 13n until the left end of the projection 13i abuts against the left end bottom of the depression 13n, thus locking the device.

Then, when the T-shaped lever 11 swings clockwise again, the actuator 13f is moved leftward by the elastic force of the spring 13j, the teeth 13d abut against the teeth 13e, and the actuator 13f is rotated in the direction of arrow P. In the succeeding counterclockwise swing of the T-shaped lever 11, the projection 13i enters a depression 13q to lock the lever. With every reciprocation swing of the T-shaped lever 11, it is locked at its first and second positions, and correspondingly the actuator 13a is locked in two modes of the first and the second. Such device is identical to that which is provided in the head portion of a ball pen, is low in cost, and can be fabricated into a small size. As described above, conventional push-on/push-off switches have a similar construction, and can be used as the locking device in the invention.

Figure 4A:
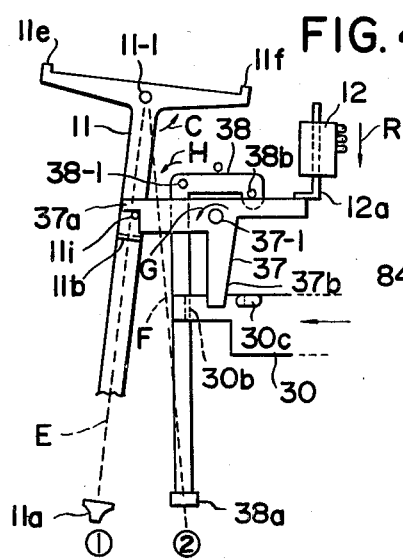
Figure 4B:
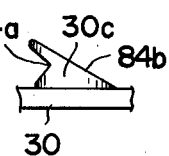

Another embodiment of the locking device for the T-shaped lever 11 will now be described in conjunction with FIG. 4. Referring to FIG. 4a, on a support shaft 37-1, which is mounted on the deck, is supported a T-shaped locking lever 37 which is elastically biased in the direction of arrow G by a spring (not shown). In the state shown, an abutting pin 11a, which is mounted on the T-shaped lever 11, is in abutment with a step-like locking portion 37a which is provided to the lever 37, and accordingly the T-shaped lever 11 is locked at the position shown in the figure, i.e., the first position of the lever 11. The bar 30 is identical to that of FIG. 1, and is adapted to make one reciprocating movement when the whole of the magnetic tape is taken up on the reel. The left-hand portion of the bar 30 is somewhat modified from the bar 30 of FIG. 1, and is provided with an abutting pin or block 30c. This abutting pin or block 30c has a shape as shown in FIG. 4b, wherein a depressed portion 84a is adapted to abut against the vertical arm of the T-shaped lever 11 for swinging the lever clockwise. The upper surface of the pin 30c is formed into a slant surface 84b.

The numeral 12 indicates a changeover switch which is identical to the changeover switch 12 of FIG. 1, which is adapted to forward/reverse drive the motor 2. The switch 12 has an actuator 12a, a bent portion of which actuator abuts against the right-hand arm of the locking lever 37. Upon termination of reproduction of the 1st channel, the bar 30 moves leftward, and the abutting pin 30c comes into abutment with the lever 37, whereby the lever 37 swings clockwise and disengages from the abutting pin 11i. Accordingly, the T-shaped lever 11 spring backs to come into abutment with an abutting pin (not shown) to take its second position, that is, come to the position of dotted line F. Accordingly, reproduction of the 2nd channel begins, and the actuator 12a rapidly spring backs in the direction of arrow R for reversing the motor 2. Accordingly, rotation of the cam 28a of FIG. 1 is also reversed, and the bar 30 returns back to its original position. Upon termination of reproduction of the 2nd channel, the bar 30 moves leftward again. At this time, since the locking lever 37 has swung to a large degree, the abutting pin 30c does not contact with the lever 37, and a portion 30b of the bar 30 pushes the T-shaped lever 11 to swing it clockwise. When the T-shaped lever 11 swings to a portion of dotted line E, the abutting pin 11i comes into abutment with the locking portion 37a of the locking lever 37, thus locking the T-shaped lever 11 at that position.

At this time, the actuator 12a is rapidly pushed back by the locking lever 37, whereby the motor 2 is forward driven, and reproduction of the 1st channel is effected. Rotation of the cam 28a (FIG. 1) is reversed, but the bar 30 can return to the right. The locking lever 37 slides on a portion 37b thereof and passes the slant surface 84b of the abutting pin 30c. Accordingly, the above-mentioned rightward return of the bar 30 is not hindered.

As will be understood from the above description, every time the tape end is encountered, the T-shaped lever 11 is brought to and kept at the positions of the dotted lines E and F respectively. It should be apparent that the indication of the channel under reproduction is provided by the marks 1, 2 and through the knob 11a. In this embodiment, by pushing the knob 11a by hand to the left, reproduction of the 2nd channel can be changed to reproduction of the 1st channel, but the converse is not possible. In order to switch from the 1st to the 2nd channel, an inverted L-shaped lever 38 is supported on a support shaft 38-1 mounted on the deck, and an abutting pin 38b mounted on the lever 38 is in abutment with the right-hand arm of the locking lever 37. The lever 38 is elastically biased in the direction of arrow H by a spring (not shown). Accordingly, when a knob 38a, which is attached to the lower end of the vertical arm of the lever 38, is pushed leftward, the locking lever 37 is driven clockwise and disengages from the abutting pin 11i, whereby the T-shaped lever 11 comes to the position of dotted line F, and reproduction can be switched from the 1st channel to the 2nd channel.

For convenience of operation, it is preferred to dispose the knobs 38a and 11a in a manner that they can be brought into alignment on a straight line, and that the knob 38a is at an inner position with respect to the knob 11a for easy pushing of only the knob 11a at the time when the both knobs are on the same straight line. When the knob 11a is at the mark 1, pushing of the knob 38a is easy because the two knobs are out of alignment. Leftward pushing of the both knobs is easy.

Other locking means employing the same principal as in the above embodiment will now be described in conjunction with FIG. 7. In FIG. 7, similar numerals indicate like parts as in FIG. 4 having similar performances and effects, and description thereof is omitted except differences from FIG. 4. The lever 37 is supported on the support shaft 37-1 mounted on the deck, and is elastically biased in the direction of arrow G. In the embodiment of FIG. 4, this lever 37 has at its end portion the locking portion, but, in the embodiment of FIG. 7, on the left end portion of the lever 37 is supported through a connecting pin 55a a lever 55 for angling with respect to the lever 37. In a slit 55b, which is formed in the left end portion of the lever 55, is loosely fit an abutting pin 11m which is mounted on the T-shaped lever 11. The left-hand arm of the lever 37 and the lever 55 normally make a stright configuration, and, when the lever 55 abuts against an abutting pin 86, which is mounted on the deck, the T-shaped lever 11 is locked at the position of dotted line E, i.e., the first position. The numeral 12 indicates a changeover switch which is identical to the changeover switch 12 of FIG. 4, and is adapted to change rotation direction of the motor 2.

When the bar 30 moves in the direction of arrow (leftward), the abutting pin 30c pushes the lever 37 to swing it clockwise, and accordingly the levers 55 and 37 angle with respect to each other. The T-shaped lever 11 is thus released from its locking position. Accordingly, the T-shaped lever 11 swings to the position of dotted line F, that is, to its second position. When the bar 30 moves again in the direction of arrow, the T-shaped lever 11 swings clockwise, the left-hand arm of the lever 37 and the lever 55 come again into the straight configuration, and the T-shaped lever 11 is locked to the position of dotted line E. As the T-shaped lever 11 sits at its first and second positions, the changeover switch 12 is operated to produce reproductions of the 1st and 2nd channels, thus automatic reverse being effected. Performances and effects of the lever 38 and knobs 38a, 11a are the same as in FIG. 4.

A modification of the T-shaped lever 11 with now be described in conjunction with FIG. 5. Referring to FIG. 5a, the T-shaped lever 11 is limited in its swinging angle by abutting pins 39a, 39b. The T-shaped lever 11 is operably connected to an actuator 42 by a center-over spring 40 through a support pin 11j, which is mounted on the T-shaped lever 11, and a support pin 42a, which is mounted on the actuator 42. On the deck is provided a locking device 41 which is of similar mechanism as the locking mechanism used in ball pens, i.e., the push-on/push-off switch as described above in conjunction with FIG. 2. In the device 41, every time the actuator 42 is depressed leftward, it is moved alternately to a first and second positions and is locked there, traveling distances to these first and second positions being different from each other. The bar 30 is the same as in FIG. 1, and makes one reciprocating movement when the whole magnetic tape is taken up on the reel.

Upon termination of reproduction of the 1st channel, the bar 30 moves leftward, and accordingly a projection 30d, which is provided on the bar 30, pushes the right end of the actuator 42. Accordingly, the actuator 42 is moved leftward and, with returning back of the bar 30 to its original position, is locked there. Accordingly, the center-over spring 40 is twisted counterclockwise, and the T-shaped lever 11 is swung to the position of dotted line F to take its second position, thus reproduction of the 2nd chanel being initiated. Upon termination of this reproduction of the 2nd channel, the bar 30 makes one reciprocation swing, and accordingly the actuator 42 moves back rightward a predetermined distance and is locked there. Accordingly, the center-over spring 40 resumes its original state as shown in the figure, and the T-shaped lever 11 returns back to the position of dotted line E, i.e., the first position, thus reproduction of the 1st channel being effected. As described above, in case the motor 2 is adapted to be unchanged in its rotational direction, the changeover switch for forward/reverse driving the motor 2 is not needed. However, in case where change of rotational direction of the motor 2 is needed at the time of switching between reproductions of the 1st and 2nd channels, provision of the changeover switch 12, which is operably connected to the T-shaped lever 11 through the abutting pin 11c as shown in FIG. 1, is necessary. Also, it is necessary to elastically bias the actuator 42 in the direction of arrow R by means of a spring which is more powerful than the center-over spring 40.

In this embodiment, movements of the T-shaped lever 11 to its first and second positions are performed very rapidly, resulting in rapid switching between the reproductions of the 1st and 2nd channels. By provision of the knob 11a to the lower end of the T-shaped lever 11 on the extension of dotted line E in the figure, the T-shaped lever 11 can be moved by hand to its left and right fixed positions thereby to perform, with ease, switching between reproductions of the 1st and 2nd channels. Indication of channels under reproduction can be obtained by marks 1, 2 in a similar manner as in the previous embodiment.

In another embodiment shown in FIG. 5b, the pinch rollers 7, 8 are supported, through support shafts 7-2, 8-2, directly on the end portions of the left-and right-hand arms of the T-shaped lever 11 of FIG. 5a. In this embodiment, the levers 7a, 8a, the support shafts 7-1, 8-1, the springs for the levers 7a, 8a whichhave been used in FIG. 1 can be omitted, thus the construction being simplified. In the illustrated state, the T-shaped lever 11 is set at its first position, and the pinch roller 8 is pressing against the capstan 5 for driving the magnetic tape rightward, thus reproduction of the 1st channel being effected. When the actuator 42 moves to the left and is locked there, the T-shaped lever 11 swings to the position of dotted line F, i.e., the second position, and the pinch roller 7 presses against the capstan 4 for driving the magnetic tape leftward, thus reproduction being switched to the 2nd channel. The changeover switch for output of the magnetic head may be interlocked to the T-shaped lever 11 in the manner of FIG. 1. In this embodiment, however, a cross-shaped lever may be employed as the lever 11, and the actuator 10a of the changeover switch 10 (identical to the switch 10 of FIG. 1) is interlockingly fit into a slit or opening 43b which is formed at the end of the upper lever arm 43. The indication of channels under reproduction can be obtained in the same manner as in FIG. 5a.

The lever arm 43 has a hole or slot 43a formed therein, into which hole is loosely fit a guide pin 44 which is mounted on the support 1 of FIG. 1. When, for the purpose of fast-feed or rewind, the support 1 is moved backward away from the cassette, the guide pin 44 moves to a position of dotted line 44a, and accordingly the cross-shaped lever 11 swings counterclockwise to a slight degree, and both pinch rollers 7, 8 depart away from the capstans 4, 5, thus fast-feed or rewind mode being effected as having bween described in conjunction with FIG. 1.

An embodiment of control for the cross-shaped or T-shaped lever 11 will now be described in conjunction with FIG. 6. Referring to FIG. 6a, the cross-shaped lever 11 is of the same construction as that of FIG. 5b. Similar numerals indicate like parts having like performances and effects. The center-over spring in FIG. 6a, however, is different in the manner of use from the center-over spring of FIG. 5. An end of a center-over spring 45 is fixed to a support pin 11k mounted on the cross-shaped lever 11, and the other end of the spring 45 is fixed to a support pin 45a mounted on the deck. On a support shaft 46-1, which is mounted on the deck, are supported a gear 46 and a lever 49 is a manner that they can rotate independently of each other. The lever 49 is elastically biased in the direction of arrow J by a spring (not shown).

On a support shaft 48-1, which is mounted on the lever 49, are supported a gear 47 and an eccentric wheel 48 which are formed integral to each other. The gears 46 and 47 have a ratio of 2 to 1 in radius, and mesh with each ohter. A guide pin 11g, which is mounted on the cross-shaped lever 11, is loosely fit into a hole or slot 53a which is formed on a crank lever 53. The right end portion of the lever 53 is connected to a support shaft 53-1 which is mounted on the gear 46. A magnetic tape 50 is guided by the capstan 5 and a guide pin 50a to be driven rightward.

On a support shaft 51-1, which is mounted on the deck, is supported a generally U-shaped lever 51 which is elastically biased in the direction of arrow K by a spring (not shown). A downward bent end portion 51a of the lever 51 is in contact with the magnetic tape. Another downward bent end portion 51b is in abutment with the right end portion of the lever 49 to be locked there. When reproduction of the 1st channel terminates, the magnetic tape increases in tension and is tightened to make the lever 51 rotate clockwise, and accordingly the portion 51b departs away from the right-hand end portion of the lever 49. Accordingly, the lever 49 rotates counterclockwise, and the eccentric wheel 48 comes into pressing contact against the pulley 5b and accordingly begins to rotate. Because the gear 47 meshes and rotates together with the gear 46 in a manner that pressing force of the eccentric wheel 48 against the pulley 5b is increased, as the load increases, the eccentric wheel 45 presses against the pulley 5b with larger force, and power transmission becomes surer. This fact has an advantage in that less torque is required for rotating the lever 51 to release the lever 49 from locking. With rotation of the eccentric wheel 48, the crank lever 53 moves rightward, and accordingly the guide pin 11g comes into abutment with the left edge of the hole 53a to rotate the cross-shaped lever 11 counterclockwise. Upon passing over the neutral point of the center-over spring 45, the lever 11 is rapidly moved to the position of dotted line F to be set at its second position, thus reproduction of the 2nd channel being initiated. Upon about one rotation of the eccentric wheel 48, tension of the magnetic tape decreases, and the lever 49 is locked by the portion 51b of the lever 51 which has returned to its original position. With further rotation of some degrees, the eccentric wheel 48 disengages from the pulley 5b and stops rotation automatically.

Upon termination of the 2nd channel reproduction, the lever 51, due to tightening of the magnetic tape 50, disengages from the lever 49 again, and accordingly the eccentric wheel 48, after about one rotation, stops rotation automatically. During this, the cross-shaped lever 11 returns, through the crank lever 53, back to the position of dotted line E, i.e., the first position, and accordingly reproduction is automatically switched to the 1st channel, that is, automatic reverse is effected. An indication of the channels under reproduction by the use of marks 1, 2 can be obtained by extending the lower arm of the cross-shaped lever 11 onto the front panel. In this embodiment, however, it is not possible to switch between channels by manually moving the knob 11a. To solve this problem, a slide bar 52 having a knob 52a is provided in operable relationship with the lever 51. When the knob 52a is depressed in the direction of arrow, the lever 51 is rotated clockwise, and the lever 49 is unlocked. Other means as the following can also be employed to unlock the lever 49. A bar 30 as used in the previous embodiment can be employed. By one reciprocating movement of the bar 30, the lever 49 can be unlocked. A known small-sized electromagnetic plunger can be employed. The lever 49 can be released from locking through an actuator or the plunger, and can be locked by supplying electricity to the plunger. This electricity is supplied as an electric pulse which can be offered by known means which are adapted to generate electric signals. Required electric power is very small. The rotating member to which the driving power is to be transmitted through pressing contact of the eccentric wheel 48 may, rather than the capstan, be a suitable rotating shaft which is driven by the motor 2.

The center-over spring 40 of FIG. 5 may be attached also in the same manner as in FIG. 6, between the cross-shaped lever 11 and the deck, FIG. 5c showing this arrangement. In this case, as shown in FIG. 5c, the actuator 42 is provided at its left end portion with a slot 42b into which is loosely fit a guide pin 42c which is mounted on the cross-shaped lever 11. With this arrangement, similar performance as in the case of FIG. 6a can be obtained, that is, as the actuator 42 is locked to the left or to the right, the cross-shaped lever 11 is, by action of the center-over spring 45, set to the position of dotted line E or set to the opposite position.

Another embodiment shown in FIG. 6b will now be described. Performances of the lever 49, gears 46, 67, and the eccentric wheel 48 are the same as in FIG. 6a. A locking mechanism, which is indicated by dotted line 54, and a tape-end detecting device are the same as those in FIG. 6a. Accordingly, upon termination of reproduction, the gear 46 will make a half rotation and then automatically stop. To the gear 46 is integrally formed an eccentric wheel 46a, to the periphery of which wheel 46a slidingly contacts the vertical arm of the T-shaped lever 11 which is the same as the lever 11 of FIG. 1. Upon termination of the 1st channel reproduction, the eccentric wheel 46a makes a half rotation, and accordingly the T-shaped lever 11 is set at its second position, thus the 2nd channel reproduction being effected. Upon termination of this 2nd channel reproduction, the eccentric wheel 46a makes another half rotation, and accordingly the T-shaped lever 11 returns back to its first position, and the 1st channel reproduction is effected, thus automatic reverse being performed.

It will be apparent that indication marks 1, 2 for reproduced channels, and changeover means for channels may be employed in the same manner as in FIG. 6a. In the embodiments of FIGS. 6a and 6b, it is required that the capstan 5 rotates always in one direction, and accordingly driving the flywheel by the drive belt 3 as shown in FIG. 1 is not permitted. Accordingly, the embodiments of FIGS. 6a and 6b can be applied only to recorder/players of the type wherein the capstans 4, 5 are driven always in opposite directions.

While the cross-shaped lever having the pinch rollers 7, 8 supported thereon is employed in the embodiment of FIG. 6a, the T-shaped lever as shown in FIG. 6b may also be employed. The pinch rollers may also be provided to the opposite end portions of the T-shaped lever shown in FIG. 6b.

A still other embodiment shown in FIG. 6c will now be described. Similar numerals as in FIGS. 1 and 6b indicate like parts, and description thereof is omitted. In FIG. 6c, a gear 28 and support shaft 28-1 are the same and those in FIG. 1. The drive belt 25 and the pulley 26 for driving the gear 28 are omitted from FIG. 6c. To the gear 28 is integrally formed a rotating wheel 28b together with the rotating cam 28a. On a support shaft 96-1, which is mounted on the deck, is supported a lever 96 which is elastically biased in the direction of arrow Y by a light spring (not shown). Clockwise rotation of the lever 96 is restricted by the locking device 54 so that an eccentric idler 95 is locked in a state where there is a small gap between the rotating wheel 28b and the minimum biasing radius point of the idler 95, i.e., the point on the periphery of the idler 95 where the distance between the periphery and the rotating axis of the idler is of the minimum value. The eccentric idler 95 is supported at its rotating axis by the lever 96 through a support shaft 95-1. A bar 97 is loosely fit to the support shaft 95-1, and is adapted to moe to the right and left along a slot 97a, which is provided in the lever 97, and through a guide pin 98 which is mounted on the deck. The left end of the bar 97 is in position where it can abut against a bent portion 11r formed on the T-shaped lever 11. The locking device 54 may be of either of a mechanism which employ a known small-sized electromagnetic plunger or a mechanism which employs a lever adapted, as shown in FIG. 6a, to be moved by tightening/loosening of the magnetic tape, thereby to lock and unlock the free end 96a of the lever 96. Alternatively, leftward movement of the bar 30 shown in FIG. 1 may be utilized for locking and unlocking the free end of the lever 96. Alternatively, electric contacts are provided in a manner that they may be closed by movement of the bar 30 thereby to control current supply to the above-mentioned electromagnetic plunger for locking and unlocking the lever 96. Alternatively, known means may be employed which electromagnetically detects stop of either one of the reel-stands 17 or 17a to offer electric output which is used to operate the above-mentioned electromagnetic plunger for locking and unlocking the lever 96.

As will be understood from the above description, upon termination of reproduction of the 1st channel, the lever 96 is released from locking due to the locking device 54, and accordingly rotates clockwise. Accordingly, the idler 95 comes into contact, through a rubber ring provided around the periphery thereof, lightly with the rotating wheel 28b to be rotated by the wheel 28b. Since, at this time, there is no load, the idler 95 can rotate with little slip between the idler 95 and the wheel 28b. Accordingly, power required for releasing the lever 96 from locking by the locking device 54 is very small. With rotation of the idler 95, the bar 97 is moved leftward, and the left end of the bar 97 comes into abutment with the bent portion 11r to swing the T-shaped lever 11 clockwise, a large load being presented. This load, however, serves, as a reaction thereof, to strongly press the idler 95 against the rotating wheel 28b, and accordingly sure power transmission can be obtained without slip between the idler 95 and the wheel 28b. When the idler 95 makes more than a half rotation, the bar 97 returns back to the right, and the T-shaped lever 11, being released from the locking mechanism 13, swings counterclockwise to be locked again to the position of dotted line F through the actuator 13a. With further rotation of some degrees, the idler 95 disengages from the rotating wheel 28b, is then locked by an actuator (the lever 51 of FIG. 6a, for example) of the locking device 54, which has returned to its original position, and then stops rotation automatically. The abutting pin 11c comes into abutment against the bent portion 12d of the actuator 12c of the changeover switch 12 to move the actuator 12c rightward to operate the switch 12 for reversing the motor 2. Though not shown in FIG. 6c, the changeover switch 10 of FIG. 1 is operated thereby to initiate reproduction of the 2nd channel. Upon termination of this 2nd channel reproduction, the lever 96 is again released from locking of the actuator of the locking device, and accordingly the idler 95 comes into contact with the rotating wheel 28b thereby to swing the T-shaped lever 11 clockwise. Load at this time is large, but, by reaction thereof, the idler 95 is strongly pressed against the rotating wheel 28b, thus slip therebetween being avoided. The above-described actions and effects are similar for either rotational directions of the idler 95 and accordingly of the motor 2. The T-shaped lever 11 will pass over the position of dotted line E and then back to the position of dotted line E to be locked there. At this time, the abutting pin 11c pushes the bent portion 12e to operate the changeover switch 12 for forward drive again the motor 2, and the changeover switch 10 of FIG. 1 is operated for effecting reproduction of the 1st channel. Thus, automatic reverse is performed wherein reproductions of the 1st and 2nd channels are successibly performed.

While the locking mechanism as employed in this embodiment is identical to that to FIG. 1, it is apparent that the locking devices for the T-shaped lever 11 in the embodiments of FIGS. 4 and 5 can also be used. In this embodiment, the pinch rollers 7, 8 may also be supported on the left- and right-hand arms of the T-shaped lever 11. Indication of reproduced channels by the positions of the knob 11a through marks 1, 2 can be obtained in the similar manner as in the previous embodiments. Manual changeover between reproductions of channels can be performed by means shown in FIG. 6a. The following means, however, are more preferable. Pushing the knob 11a, through which the indication of channels is obtained, to the right or left is the best means. Electric contacts will be provided in a manner that they can be closed by lightly pushing the knob 11a by hand to the left or right. The locking device 54 will be an electromagnetic device such as a small-sized electromagnetic plunger, which will permit the lever 96 to be unlocked when the above-mentioned electric contacts are closed. With such arrangement, by pushing the knob 11a rightward when it is at the mark 1, or leftward when it is at the mark 2, changeover between reproductions of channels can be performed with ease. For realizing the above-described performance, the T-shaped lever 11 may be modified into a construction as shown in FIG. 6d. Referring to FIG. 6d, some length of the lower end portion of the vertical arm of the T-shaped lever 11 is cut off, and a lever 99 is supported on the abutting pin 11c for rotation. An extension 99a of the lever 99 is disposed between electric contact pieces 104 and 103, which are of U-shaped configuration, for pressing contact therewith. Respective end portions of the contact pieces 103, 104 and other U-shaped electric contact pieces 102, 101 are fixed to an insulating support 100. Outlet leads are provided to the respective contact pieces, and are extended along the vertical arm of the T-shaped lever 11 to pass near the support shaft 11-1 and are connected to an exciting coil of the electromagnetic device 54, so that, upon mutual contact of either set of the contact pieces 102, 104, or 101, 103, a circuit may be completed for supplying current to the exciting coil. When the knob 11a, which is attached to the lower end of the lever 99, is pushed rightward to rotate the lever 99 counterclockwise, the contact pieces 102 and 104 come into contact with each other. Accordingly, electric current is supplied to the exciting coil, and locking of the lever 96 by the locking device 54 is disabled. Accordingly, the T-shaped lever 11 moves to the position of dotted line F to effect reproduction of the 2nd channel. Similarly, when the knob 11a is pushed leftward, the T-shaped lever 11 moves to the position of dotted line E, and reproduction of the 1st channel is effected.

While the idler 95 is supplied with power for rotation by the rotating wheel 28b, the power can also be supplied directly from the capstan, or from a rotating shaft which is separately provided to be driven by the capstan through a drive belt.

While, in the above description of this embodiment, rotational direction of the motor 2 is changed according to alternation of channels to be reproduced, this embodiment can also be applicable in a case where the motor 2 rotates always in one direction while the capstans 4 and 5 are driven in opposite directions. In the embodiments of FIGS. 6a and 6b, when the motor 2 is reversed, the gear 47 meshes and rotates together with the gear 46 in a manner that pressing force of the eccentric wheel 48 against the pulley 5b is decreased, and accordingly power transmission will become uncertain. In the embodiment of FIG. 6c, however, such uncertain transmission of power is avoided. Power required for releasing from locking by the electromagnetic locking device 54 is small. This is especially advantageous in case of employing an electromagnetic device because required input electric power is small. For this reason, power transmission to the idler 95 can be performed without slip while elastical force for biasing the lever 96 in the direction of arrow Y is small.

In automatic reverse apparatuses, it is preferred that, upon encountering a tape and in case of fast-feed, both of automatic changeover to the next channel and return to reproduction mode can be performed, and, upon encountering a tape end in case of rewind, reproduction of the same channel can be effected without changeover to another channel.

Means for realizing such performance will now be described in conjunction with FIG. 8. Referring to FIG. 8a, to a frame 62, which is provided on the deck, are supported push-button rods 63, 64, 65 in a manner that they can slide and spring back. The rods 63, 64, 65 have on their ends push-buttons 63a, 64a, 65a, respectively. A locking bar 67 is supported to the frame 62, is elastically biased leftward by a spring 66, and have locking pins mounted thereon which are adapted to lock the corresponding push-button rods, thus forming a known alternative selection mechanism. In the state shown in the figure, the push-button 63a is depressed, and the rod 63 is locked at the depressed position. In this mechanism, upon depression of any one of the push-buttons, the push-button rod of another push-button which has been depressed and locked will spring back. When a lever 69 is rotated counterclockwise, the locking bar 67 is made to slide rightward through a pin 67a mounted on the lever 67, whereby a push-button rod which has been locked by the bar 67 is released from locking and returns back to its original position. The lever 69 is supported through a support shaft 69-1 on the deck for rotation, and the lower end portion of the lever 69 is in position for abutting against an abutting pin 30e which is mounted on the bar 30. On a branch-like extension of the push-button rod 63 is supported through a support shaft 68-1 a lever 68 for rotation. To an opening or depressed portion 68a, which is formed in the free end portion of the lever 68 confronts the left end of the bar 30. On a linear extension of the push-button rod 63 is mounted an abutting pin 63b which is adapted to abut against the fore edge of the support 1 of FIG. 1. On an extension of the push-button rod 64 is mounted an abutting pin 64b which is adapted to abut against the fore edge of the support 1 of FIG. 1. In the illustrated state, the push-button 63a is depressed, the push-button rod 63 is locked at the depressed position, and the abutting pin 63b pushes the support 1 to hold it apart away from the cassette. At this time, the push-button rod 63 depresses an actuator of an electric switch 70 to operate the switch for changeover. The switch 70 serves as an changeover switch for forward/reverse rotations of the motor 2, and accordingly the motor 2 is rotating in the reverse direction. Accordingly, in this state, rewind mode is effected as previously described in conjunction with FIG. 1. Then, upon depression of the push-button 65a, the push-button rod 63 spring backs, and accordingly the support 1 moves forward near to the cassette, thus reproduction mode being effected. At this time, the switch 70 backs, and rotational direction of the motor 2 is changed.

Then, upon depression of the push-button 64a, the push-button rod 64 is moved and locked, and the push-button 65a returns to its original position. The abutting pin 64b pushes the support 1 away from the cassette, thus fast-feed mode being effected. It will be apparent from the above description that any mode of reproduction, fast-feed or rewind can be selectively effected by depressing the corresponding push-button. Suppose the push-button 63a is depressed and accordingly rewind mode is being effected, the bar 30 will make one reciprocation movement at the end of the channel concerned. At this time, as shown in FIG. 8b, the left end portion of the bar 30 goes into and passes leftward through the opening 68a. This left end portion of the bar 30 passes over the T-shaped lever 11 so that the lever 11 is not rotated. Accordingly, switching of reproduction from the 1st channel to the 2nd channel is not made. The lever 69 is pushed by the abutting pin 30e to be driven counterclockwise, and accordingly the locking bar 67 is moved rightward, and the push-button rod 63 spring backs, thus reproduction mode being effected. Thus, reproduction of the same channel is obtained again, which suffices the purpose of rewind of hearing the same channel repeatingly.

Then, during fast-feed which is effected by depression of the push-button 64a, upon termination of reproduction the 1st channel, the bar 30 makes one reciprocation movement. At this time, since the push-button rod 63 and accordingly the lever 68 have returned to their original positions, the left end of the bar 30 cannot enter the opening 68a, and abuts against the lever 68 to rotate it counterclockwise. Consequently, the free end 68b of the lever 68 pushes the T-shaped lever 11, and accordingly the locking device 13 of FIG. 1 returns to its original state, and the T-shaped lever 11 swings rightward to its second position, thus reproduction of the 2nd channel being effected. At the same time, the lever 69 rotates counterclockwise, and accordingly the locking bar 67 is moved rightward, and the push-button 64a returns to its original position, thus reproduction of the 1st channel being effected. This suffices the purpose of fast-feed of hearing the next channel from its start point. Relationship between the switch 70 (changeover switch) of FIG. 8a, the changeover switch 12 of FIG. 1 and the switch 81 of FIG. 1 will now be described.

Figure 9:
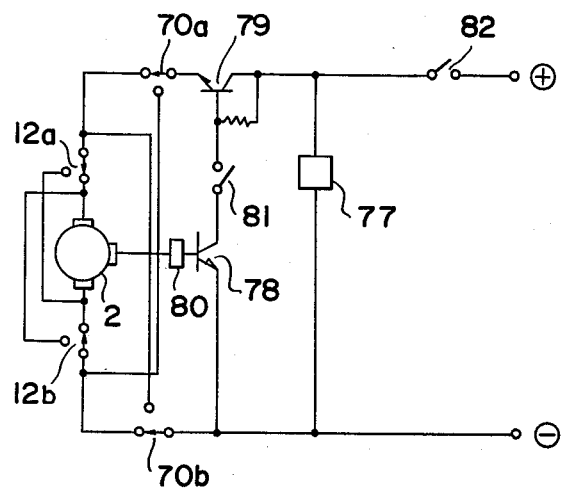
FIG. 9 is a control circuit diagram for a capstan motor used in the apparatus of FIG. 1.

Referring to FIG. 9, a power supply switch 82 is adapted to be closed by loading of a cassette, and to open when the cassette is ejected, as previously described in conjunction with FIG. 1. The numeral 77 indicates a reproduction amplifier including the magnetic head. Voltage, which is obtained from the motor 2 in proportion to rpm thereof, is smoothed by a circuitry 80 and is inputted to the base of a transistor 78. When rpm of the motor 2 exceeds a predetermined set value, collector current of the transistor 78 will rapidly increase resulting in rapid decrease in base voltage and rapid increase in emitter-collector resistance of a transistor 79, and thus the motor 2 is controlled to rotate at a constant rpm. When a switch 81 is opened, the transistor 79 will be rendered conductive to disable the governor for the motor 2, and thus the motor 2 rotates at a high speed. Thus, when support 1 moves backward, the motor 2 rotates at the high speed through the action of the switch 81.

The changeover switch 12 contains changeover switches 12a, 12b. When both switches 12a, 12b are interlockedly operated for changeover, rotational direction of the motor 2 is reversed. The switches 12a, 12b are operated by the actuator 12c of the switch 12 of FIG. 1, and accordingly rotational direction of the motor 2 is changed depending on rightward/leftward movements of the actuator 12c. Changeover switches 70a, 70b shown in FIG. 9 are contained in the changeover switch 70 of FIG. 8, and are adapted to be interlockedly operated by depression of the push-button 63a. Accordingly, upon depression of the push-button 63a, the motor 2 is reversed, and, upon returning back of the push-button 63a to its original position, the motor 2 rotates again in the forward direction.

Referring to FIG. 8c, another embodiment which is adapted to have a similar performance as the mechanism of FIG. 8a will now be described. Similar numerals as in FIG. 8a indicate like parts making like actions, and description thereof is omitted. On a support shaft 71-1, which is mounted on the deck, is supported a cross-shaped lever 71. A knob 71a, which is attached to the lower end of the lever 71, is protruded onto the front panel. On the right- and left-hand arms of the lever 71 are mounted respectively abutting pins 71c, 71b which are in abutment with bars 73, 72. The bars 72, 73 are supported on the deck in a manner that they can slide fore and aft and can spring back by means of springs (not shown). The numeral 75 indicates a bar which is provided on the deck for sliding to the right and left and is elastically biased rightward by a spring (not shown). The bar 75 is adapted to make a reciprocating movement, through abutment with the abutting pin 30e, together with the bar 30. On the upper end portions of extensions of the bars 72, 73 are mounted respectively abutting pins 72a, 73a which are in positions for abutting against the fore edge of the support 1 of FIG. 1. The lever 71 can be clik stopped by a plate-like locking member 76 through an end portion 71d of the upper arm of the lever 71. Details of this clik-stop will now be described in conjunction with FIG. 8d. In FIG. 8d are shown the locking member (clik-stop mechanism) 76 and the bar 75. The locking member 76 is supported on the deck for rotation through a shaft 76-1 which is fixed to the member 76, and is elastically biased in the direction of arrow M by a spring (not shown). In the upper edge of the free end portion of the member 76 are formed depressions 76b, 76c, 76d which are adapted to receive therein the end portion 71d (FIG. 8c) for clik stopping the lever 71. When the bar 75 moves leftward, a slant surface portion 75b, which is formed on the lower edge of the bar 75, comes into abutment with a bar 76a, which is fixed to the free end of the member 76, to force the free end of the member 76, which contains the depressions 76b, 76c, 76d, downward, and thus the end portion 71d is released from clik-stop.

When the knob 71a (FIG. 8c) is pushed rightward, the lever 71 is rotated counterclockwise to push through the abutting pin 71c to the bar 73, and accordingly the support 1 is moved through the abutting pin 73a away from the cassette. Accordingly, fast-feed mode is effected. At this time, the end portion 71d is clik stopped in the depression 76c, and the bar 72 is restrained from spring backing by an abutting pin 72b. When the knob 71a is backed to the neutral point, i.e., the point where the end portion 71d enters the depression 76b, the support 1 moves forward, thus reproduction being effected.

During fast-feed mode, which is effected with the knob 71a being pushed the right, when the end of the 1st channel is encountered, the bar 30 makes one reciprocation movement, and accordingly the free end 68b of the lever 68 is pushed to be driven counterclockwise. Accordingly, the T-shaped lever 11 is pushed by the free end 68a to be moved to its second position where reproduction of the 2nd channel is allowed. At the same time, the bar 75 is pushed by the abutting pin 30e to be moved leftward, and accordingly the end portion 71d is released from clik-stop. Accordingly the support 1 is moved by the spring 6 toward the cassette, and thus reproduction is effected, and the lever 71 returns to the neutral point. As will be understood from the above description, when a tape end is encountered during fast-feed, reproduction is automatically changed over to the next channel.

When the knob 71a is pushed to the left, the bar 72 is pushed through the abutting pin 71b forward, the support 1 is moved through the abutting pin 72a away from the cassette, the switch 70 is operated for changeover, and the motor 2 is reversed, thus rewind being effected. The end portion 71d enters the depression 76d to be clik stopped there. When a tape end is encountered, the bar 30 makes one reciprocation movement, and accordingly the portion 71d is released from clik-stop, and the lever 71 returns to the neutral point, thus reproduction mode being effected. At this time, the lever 68 has moved forward to a position where the opening 68a confronts the left end of the bar 30 for permitting this left end to pass through the opening 68a, and accordingly the bar 30 will not abut the lever 68. Accordingly, the T-shaped lever 11 remains at its first position, and changeover between channels is not made. As will be understood from the above description, by rewind, the same channel can be repeatedly reproduced from its start point. The lever 71 may alternatively be formed into a T-shaped, and the clik-stop mechanism may be provided in another part.

To sum up, the mechanism of FIG. 8 comprises a device wherein, by means for detecting tape end, the T-shaped lever 11 is moved to be set at its first and 2nd positions thereby to correspondingly effect changeover between the 1st and 2nd channels, and a device wherein, in response to operations of the knob and push-button for directing rewind to be made, the system for driving the T-shaped lever is disconnected from the above-mentioned detecting means.

When applying the above summed up principle of FIG. 8 to the embodiments of FIGS. 5a and 5b, the arrangement will be modified as follows. In FIG. 5a, the projection 30d is connected to the main body of bar 30 by a hinge in a manner that the projection 30d can angle with respect to the main body while they are normally held in a plane. The mechanism of FIG. 8 but the lever 68 is provided. The anglable projection 30d is adapted to be angled upward with respect to the main body of bar 30 through a lever-linkage by a portion of the push-button rod 63 when the push-button 63a is depressed, so that the projection 30d may not abut against the right end of the actuator 42 at the time of leftward movement of the bar 30.

When applying the above summed up principle of FIG. 8 to the embodiment of FIG. 6a, the arrangement will be modified as follows. The mechanism of FIG. 8 but the lever 68 is provided. When the push-button 63a is depressed, the right end portion 49a of the lever 49 (FIG. 6a) will be pushed in the direction of arrow W through a lever-linkage by movement of the push-button rod 63, so that a detection signal of a tape end may be prevented from transmission to the lever 49. In this case, it is necessary to provide a known means (automatic shut-off means) for unlocking the push-button rod 63 from the locking bar 67 (FIG. 8) by utilizing the tape-end detection signal.

Figure 10:
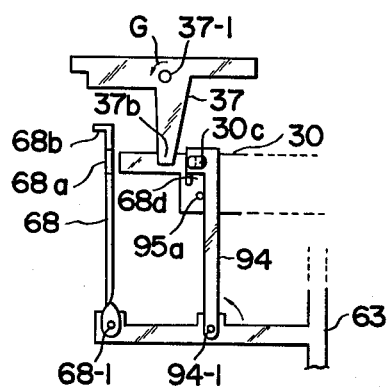
FIG. 10 shows a modification of the mechanisms of FIGS. 8a to 8d.

When applying the above summed up principle of FIG. 8 to the embodiment of FIG. 4, means as shown in FIG. 10 will be employed. In FIG. 10 are shown modified portions in the bar 30 and the lever 37. The abutting pin 30c is omitted from the bar 30, and an abutting pin 95a is mounted on the bar 30. The mechanism of FIG. 8a is provided, wherein a lever 94 is pivoted through a support shaft 94-1 on the branch-like extension of the push-button rod 63, the abutting pin 30c is provided on the free end portion of the lever 94, and the lever 94 is lightly biased counterclockwise (in the direction of arrow) to abut against the abutting pin 95a. The illustrated state is of rewind mode where the push-button 63a is depressed. In this state, when a tape end is encountered, the bar 30 will move leftward, and the abutting pin 30c will abut against the end portion 37a of the lever 37. However, the levers 37 and 94 are so designed that the lever 37 will not be clockwise rotated by the force which is applied to the lever 37 through abutment of the abutting pin 30c, and accordingly only the lever 94 can rotate counterclockwise. Accordingly, locking of the T-shaped lever 11 by the lever 37 is not disabled. The locking bar 67 of FIG. 8, however, is moved rightward, and the push-button rod 63 spring backs, thus reproduction mode being effected. In a state where the T-shaped lever 11 is at its second position (position of dotted line F in FIG. 4), when a tape end is encountered during rewind mode with the push-button 63a being depressed, and the bar 30 moves leftward, the left end portion of the bar 30 can pass through the opening 68a, and accordingly the end 68b of the lever 68 will not push the T-shaped lever 11 as previously described in conjunction with FIG. 8a. Accordingly, reproduction mode is effected without switching to another channel. As described above, at the time of rewind, reproduction of the same channel is effected again without switching to another channel when a tape end is encountered. At the time of fast-feed, since the push-button 63a and the pushbutton rod 63 have spring backed, the bar 30 pushes the lever 68 to rotate it counterclockwise, and the free end 68b of the lever 68 pushes the T-shaped lever 11. And, since the abutting pin 95a has entered a depression 68d which is provided in the lever 94, the abutting pin 30c pushes the lower end portion 37b of the lever 37 in a similar way as in the case where the pin 30c has been mounted on the bar 30 in the previous embodiments, and other actions are similar as in the case of FIG. 4. Accordingly, switching to reproduction as well as switching to the next channel is performed. Means of FIG. 10 can be applied also to the embodiment of FIG. 8b. Thus, the above-mentioned principle can be applied to the respective previous embodiments, whereby, in case of rewind, upon an tape end being encountered, change to reproduction is made without switching to another channel; and, in case of fast-feed both switching to the next channel and change to reproduction are made. Thus, according to the invention, an advantageous automatic reverse apparatus of car-loaded type can be obtained.

Thus, there is provided in accordance with the invention a recording reproducing mechanism which has the advantages discussed above. The embodiments described are intended to be merely exemplary and those skilled in the art will be able to make variations annd modifications in them without departing from the spirit and scope of the invention. All such modifications and variations are contemplated as falling within the scope of the claims.

What is claimed is:

1. An improvement in an automatic reverse apparatus for a magnetic tape recorder/player of the type which employs a magnetic tape contained in a cassette provided with first and second channels and which includes a magnetic head with head channels adapted to contact said magnetic tape to selectively record/reproduce each of said tape channels, a pair of reels for winding and rewinding said tape, first and second capstans for transferring the tape alternatively in forward and reverse directions, first and second pinch rollers associated with said capstans and adapted to alternatively contact each respective capstan, an operating lever movable between a first and a second position, the movement of said lever to said first position causing said first pinch roller to contact said first capstan and the movement of said lever to said second position causing said second pinch roller to contact said second capstan, switching means adapted to selectively switch between the head channels of the magnetic head in response to the movement of the operating level between its first and second positions, tape-end detection means for sensing when the magnetic tape has been completely wound upon one of the reels and generating a mechanical signal indicating the end of the tape, and capstan power means for driving the capstans and the reels, the improvement comprising:

(a) actuator means cooperative with said capstan power means and adapted to reciprocatively move between predetermined positions in response to said mechanical signal indicating that the tape has been completely wound upon one of the reels;

(b) locking means associated with said actuator means and adapted to be locked at a first mechanical positon by one reciprocating movement of said actuator means and locked at a second mechanical position by a second, successive reciprocating movement of said actuator means;

(c) means operatively connected to said locking means for setting said operating lever at its first position when said locking means is locked at its first mechanical position and for setting said operating level at its second position when said locking means is locked at its second mechanical position, whereby, when the operating lever is set to its first position, the first pinch roller contacts the first capstan to transfer the magnetic tape in forward direction onto one of the reels and the switching means is activated to switch the head channels to record/reproduce the first tape channel and, when the operating level is set to its second position, the second pinch roller contacts the second capstan to transfer the tape in the reverse direction onto the other of the reels and the switching means switches the head channels to record/reproduce the second tape channel.

2. An improved automatic reverse apparatus according to claim 1, wherein said operating lever is T-shaped and is rotated about a support shaft located between the arms of the T-shaped lever, the free end portions of the arms adapted to bring each said pinch roller into contact with its respective capstan.

3. An automatic reverse apparatus according to claim 2, wherein said switching means is a changeover switch located in proximity to said magnetic head and includes an extending rod which is depressed by one of the arms of said T-shaped lever as said lever is rotated between its first and second positions, the depression of said rod activating said changeover switch to switch reproduction from one channel to the other.

4. An improved automatic reverse apparatus according to claim 2, wherein said actuator means includes a reciprocating means which is urged by a spring so that one end of said reciprocating means may push a free end portion of a lower arm of said T-shaped lever, said locking means engaging the free end portion and locking said T-shaped lever at its first position when the lever is rotated to the left and at its second position when said lever is rotated to the right.

5. An improved automatic reverse apparatus according to claim 2, wherein the pinch rollers are located on the free end portions of the arms of said T-shaped lever and a spring is provided between the lever and a main body of the apparatus to urge each pinch roller to contact its respective capstan.

6. An improved automatic reverse apparatus according to claim 5, wherein the support shaft of said T-shaped lever extends upwards to engage a support carrying said magnetic head, said apparatus further including a mechanism which moves the T-shaped lever to a position between its first and second positions when said support is moved away from the cassette.

7. An improved automatic reverse apparatus according to claim 1, wherein the capstan power means includes a motor for driving said first capstan in a forward direction and for driving said second capstan through a drive belt in the same direction, said apparatus further including a changeover switch which is activated by said operating lever to drive said capstan motor in a forward direction when said lever is set at its first position and in a reverse direction when said lever is set at its second position.

8. An improved automatic reverse apparatus according to claim 1, wherein said operating lever has an extended portion which protrudes from a front panel of the tape recorder/player and has a knob attached thereto, the position of said extended portion with respect to the surface of said panel providing an indication of the tape channel being reproduced.

9. An improved automatic reverse apparatus according to claim 1, further comprising a support shaft provided between said pair of reels, a pulley provided on said support shaft and driven by one of said capstans through a drive belt, a rotating wheel provided on said support shaft and driven by said pulley, a first lever loosely fitted to said support shaft, a second lever pivotally connected to a free end of said first lever, an idler provided at a free end of said second lever, and a spring for urging said rotating wheel and said idler to contact against each other whereby said idler alternatively moves to the right and left depending upon the rotational direction of said one capstan to selectively contact and drive each of said reels.

10. An improved automatic reverse apparatus according to claim 1, wherein said operating lever is rotatably supported on a main body of said apparatus, said actuator means including a reciprocating means, the lever being biased by a spring against the pressing force of said reciprocating means, said locking means including a push-on/push-off switch mechanism which engages a free end portion of said lever to set said lever at its first and second positions.

11. An improved automatic reverse apparatus according to claim 10, wherein said capstan power means is a motor and further including a changeover switch having an actuator, said actuator adapted to engage the free end portion of said lever to activate said changeover switch and switch the motor directon, whereby said motor is switched to drive in a forward direction when said lever engages the actuator at the first position of said lever and in the reverse direction when the lever engages the actuator at the second position of the lever.

12. An improved automatic reverse apparatus according to claim 10, wherein the locking mechanism is similar to that used in a conventional ballpoint pen whereby said operating lever is set at its first position by one depression of said mechanism and at its second position by a succeeding depression of said mechanism.

13. An improved automatic reverse apparatus according to claim 1, wherein said first and second capstans are driven in the same direction, said operating lever being a rotatable lever biased in one direction by a spring, said actuator means including a reciprocating bar disposed so that it may push against the elastic force of said spring to move said operating lever to its first position by one reciprocating movement of the bar, said locking means including a locking lever for automatically locking the operating lever when it is moved to its first position and a disabling mechanism for unlocking said operating lever to permit said operating lever to swing back to its second position by a second reciprocating movement of said bar.

14. An improved automatic reverse apparatus according to claim 13, wherein said capstan power means is a motor and said locking lever is adapted to actuate a changeover switch to reverse the motor direction when the operating lever is locked at its first position and again when said operating lever is unlocked and swings to its second position.

15. An improved automatic reverse apparatus according to claim 13, further including a manual lever connected to said locking lever which protrudes from a surface of a panel of said recorder/player whereby said manual lever is employed to disable the locking lever and unlock said operating lever.

16. An improved automatic reverse apparatus according to claim 1, wherein said operating lever is pivotally connected to the recorder/player and said actuator means includes a reciprocating bar adapted to make one reciprocating movement when the magnetic tape has been completely taken up on one of the reels, said locking means including an actuator adapted to be locked at a first position by said one reciprocating movement of said bar and to be locked at a second position by a succeeding reciprocating movement of said bar.

* * * * *

UNITED STATES PATENT AND TRADEMARK OFFICE
CERTIFICATE OF CORRECTION

PATENT NO. : 4,159,492

DATED : June 26, 1979

INVENTOR(S) : ITSUKI BAN et al

It is certified that error appears in the above-identified patent and that said Letters Patent are hereby corrected as shown below:

Column 1, line 13, delete "change running";
         line 34, before "indication" insert --lamp--;
         line 36, delete "is" and insert --are--;
         line 49, delete "be" and insert --been--.

Column 2, line 33, after "of" insert --the--;
         line 50, delete the comma (,) after "channels";
         line 67, delete "and locks" and insert --acts--.

Column 3, line 4, delete "rally" and insert --rarily--;
         line 39, delete "dimentions" and insert --dimensions--.

Column 5, line 10, change "conjection" to read --conjunction--;
         line 34, change "conjection" to read --conjunction--;
         line 42, delete "being".

Column 6, line 22, delete "conjection" and insert --conjunction--.

Column 8, line 23, after "direction" insert --is--;
         line 64, before "major" insert --the--.

Column 10, line 2, delete "11a" and insert --11i--;
         line 32, change "spring backs" to read --springs back--

UNITED STATES PATENT AND TRADEMARK OFFICE
CERTIFICATE OF CORRECTION

PATENT NO. : 4,159,492
DATED : June 26, 1979
INVENTOR(S) : ITSUKI BAN et al

It is certified that error appears in the above-identified patent and that said Letters Patent are hereby corrected as shown below:

Column 11, line 33, change "stright" to read --straight--;
           line 57, change "with" to --will--.
Column 12, line 1, delete "a";
           line 27, delete "in" and insert --the--;
           line 51, change "left-and" to read --left- and--;
           line 54, change "whichhave" to read --which have--.
Column 13, line 6, after "obtained" insert --through the knob 11a--;
           line 30, delete "is" and insert --in--;
           line 38, change "ohter" to read --other--.
Column 15, line 48, change "moe" to --move--;
           line 53, delete "of" before and after "either".
Column 16, line 52, delete "again" and insert --by--;
           line 56, change "successibly" to read --successively--;
           line 58, delete "to" (second occurrence) and insert --of--.
Column 18, line 3, delete "of";
           line 15, change "have" to read --has--
           line 34, delete "To an" and insert --An--;
           line 48, delete "an" and insert --a--.

UNITED STATES PATENT AND TRADEMARK OFFICE
CERTIFICATE OF CORRECTION

PATENT NO. : 4,159,492

DATED : June 26, 1979

INVENTOR(S) : ITSUKI BAN et al

It is certified that error appears in the above-identified patent and that said Letters Patent are hereby corrected as shown below:

Column 19, line 17, before "the" (first occurrence) insert --on--.
Column 20, line 52, change "spring backing" to --springing back--;
line 58, after "pushed" insert --to--.
Column 21, line 26, change "shaped" to --shape--;
line 43, after "mechanism" insert --is like that of--;
line 44, delete "the" (first occurrence) and insert --no--;
line 53, after "mechanism" insert --is like that of--;
line 54, delete "the" (first occurrence) and insert --no--.
Column 22, line 19, change "spring backs" to --springs back--;
line 34, change "spring backed" to --sprung back--;
line 48, delete "an" and insert --a--;
line 59, change "annd" to --and--.
Column 23, line 16, change "level" to --lever--;
line 38, change "level" to --lever--;
line 46, change "level" to --lever--.

Signed and Sealed this

First Day of January 1980

[SEAL]

Attest:

SIDNEY A. DIAMOND

Attesting Officer

Commissioner of Patents and Trademarks